(12) United States Patent
Benedict et al.

(10) Patent No.: US 7,969,293 B2
(45) Date of Patent: Jun. 28, 2011

(54) INTEGRATED READ STATION FOR A WHEEL-MOUNTED VEHICLE

(75) Inventors: Robert Leon Benedict, Tallmadge, OH (US); Joseph Carmine Lettieri, Hudson, OH (US); Robert Edward Lionetti, Bereldange (LU); Anthony William Parsons, Domeldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 337 days.

(21) Appl. No.: 12/250,161

(22) Filed: Oct. 13, 2008

(65) Prior Publication Data

US 2010/0090819 A1 Apr. 15, 2010

(51) Int. Cl.
*B60C 23/00* (2006.01)
*B60C 23/02* (2006.01)

(52) U.S. Cl. .......................... 340/442; 340/444; 340/447
(58) Field of Classification Search .................... 340/442
See application file for complete search history.

(56) References Cited

U.S. PATENT DOCUMENTS

| | | | | |
|---|---|---|---|---|
| 4,067,235 | A | * | 1/1978 | Markland et al. ............. 73/146.5 |
| 5,192,954 | A | * | 3/1993 | Brockelsby et al. ............. 342/42 |
| 5,445,020 | A | * | 8/1995 | Rosensweig ................. 73/146.2 |
| 5,522,144 | A | * | 6/1996 | Smoorenburg ............ 33/203.14 |
| 5,753,810 | A | * | 5/1998 | Bass ............................ 73/146.3 |
| 5,942,681 | A | * | 8/1999 | Vollenweider et al. ....... 73/146.2 |
| 6,246,317 | B1 | * | 6/2001 | Pickornik et al. ............. 340/447 |
| 7,196,637 | B2 | * | 3/2007 | Sabet et al. ................... 340/933 |
| 2003/0006895 | A1 | | 1/2003 | Drake et al. .................. 340/445 |

FOREIGN PATENT DOCUMENTS

| DE | 2610621 | 9/1977 |
|---|---|---|
| EP | 2085254 | 8/2009 |
| WO | 2005/072993 | 8/2005 |

OTHER PUBLICATIONS

European Search Report completed Jun. 10, 2010.

\* cited by examiner

*Primary Examiner* — Travis R Hunnings
(74) *Attorney, Agent, or Firm* — Richard B. O'Planick

(57) ABSTRACT

A read station and method for a vehicle includes a support pad for admitting and exiting a vehicle onto an upper pad surface; two or more data-receiving systems, one or both of such systems receiving a data transmission from a vehicle situated on the read station pad surface. The data-receiving systems include an identification-data transmission system and a monitored parameter-data transmission system. One or more of the read station data-receiving systems may be configured to effect data transmission from the vehicle as the vehicle moves across the support pad. The information-data transmission system couples a vehicle wheel unit based RFID tag with an electric field established by one or more system antennae disposed on the support pad. The monitored parameter-data communication system includes one or more wheel-unit mounted monitoring device(s) transmitting data to one or more receivers disposed within the read station and an initiator sub-system that transmits a signal from pad based antenna(s) to initiate a data transmission sequence.

16 Claims, 19 Drawing Sheets

INTEGRATED READ STATION FOR A WHEEL-MOUNTED VEHICLE

FIELD OF THE INVENTION

The present invention relates generally to tire monitoring systems for a vehicle and, in particular, to a read station for accessing vehicle specific data.

BACKGROUND OF THE INVENTION

In commercial trucking the tires on a trailer are the highest cost item in the operation of such trailers due to theft, damage, and normal replacement. It is common within the commercial trucking industry for trailers to be either leased by a trailer leasing entity to a trucking company pulling the trailers, or owned directly by the trucking company. In either case, it is important that the tires on each trailer be identified and certain tire/vehicle parameters monitored in order to minimize operational costs associated with their use. It is therefore desirable to monitor in a cost effective and expeditious manner certain vehicle-specific data as tire and vehicle identification and monitored vehicle parameter data (such as tire air pressure) in order to maximize operational efficiencies.

SUMMARY OF THE INVENTION

In one aspect of the invention, a read station for a vehicle includes a support pad for admitting and exiting a vehicle onto an upper pad surface; two or more data-receiving systems, one or both of such systems receiving a data transmission from a vehicle situated on the read station pad surface. The data-receiving systems include an identification-data transmission system and a monitored parameter-data transmission system. The identification-data transmission system and the monitored parameter-data transmission system may be synchronized to sequentially process a respective data transmission from the vehicle situated on the upper pad surface or alternatively, arranged to simultaneously process a respective data transmission from the vehicle so positioned.

According to another aspect of the invention, one or more of the read station data-receiving systems may be configured to effect data transmission from the vehicle as the vehicle moves across the support pad. The information-data transmission system couples a vehicle wheel unit based RFID tag with an electric field established by one or more system antennae disposed on the support pad. The monitored parameter-data communication system includes one or more wheel-unit mounted monitoring device(s) transmitting data to one or more receivers disposed within the read station. In another aspect of the invention, the monitoring device(s) operationally measure one or more wheel unit parameters such as but not limited to tire air pressure and generates a data transmission indicative of the measured wheel unit parameter.

In a further aspect of the invention, the identification-data transmission system and/or the monitored parameter-data transmission system may include one or more drive-over pad-mounted antennae embedded within the support pad along a vehicle pad-traversing path.

In yet another aspect of the invention, a method for reading data transmitted from a vehicle supported by at least one wheel unit includes: moving the vehicle to an upper pad surface of a support pad; transmitting identification-data from the vehicle through a pad-based identification-data transmission system; transmitting monitored parameter-data from the vehicle through a pad-based monitored parameter-data transmission system; and removing the vehicle from the upper pad surface at the conclusion of data transmission. The method may include moving the vehicle over the upper pad surface along a read path that operationally aligns one or more one data transmitting devices mounted to a wheel unit of the vehicle over one or more pad-mounted antenna devices. The method may further include effecting data transmission from one or more data transmission systems as the vehicle moves across the upper pad surface.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

BRIEF DESCRIPTION OF THE DRAWINGS

The invention will be described by way of example and with reference to the accompanying drawings in which.

DETAILED DESCRIPTION OF THE INVENTION

Figure 1:
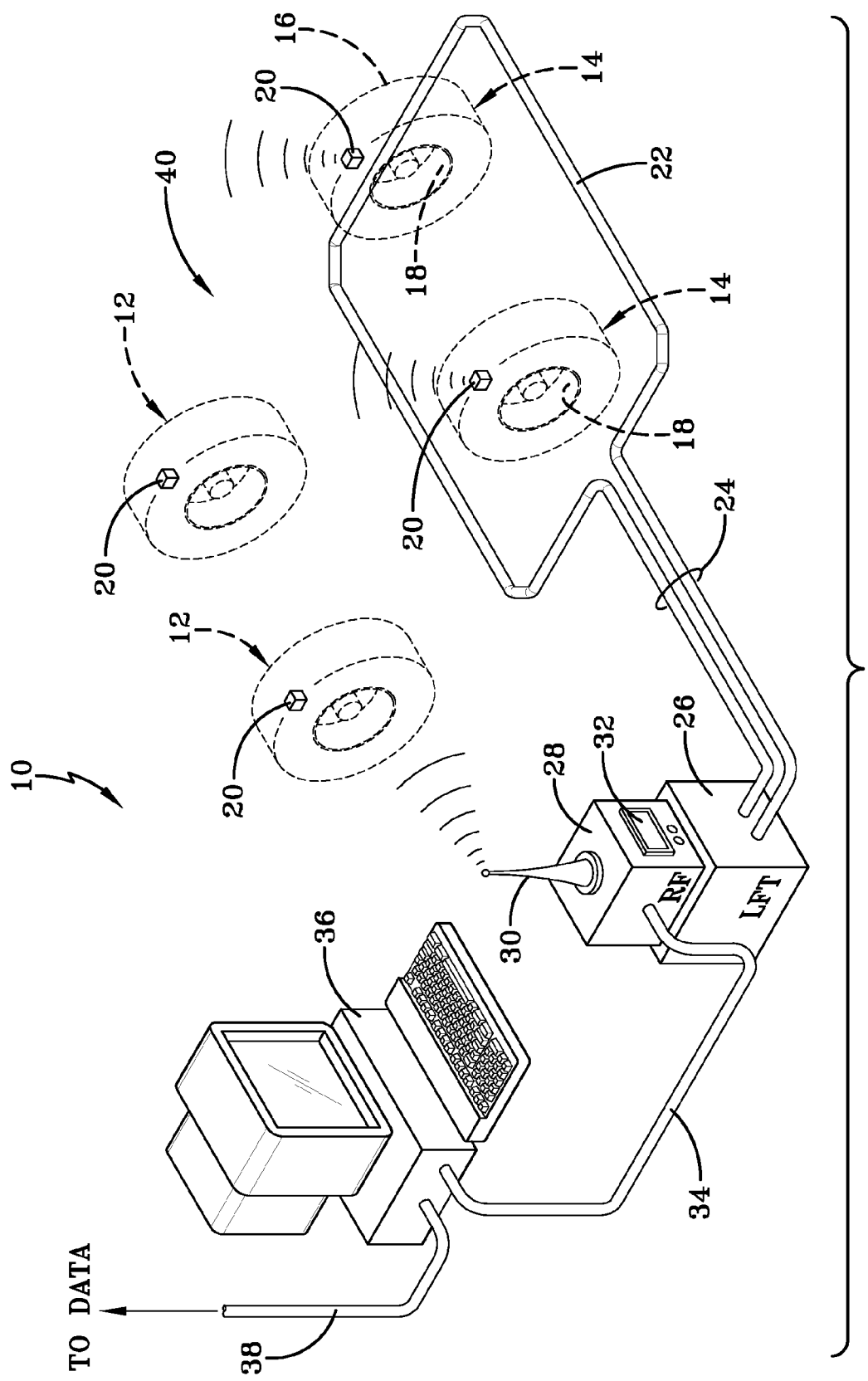
FIG. 1 is a schematic diagram of a monitoring system embodying the subject invention.
Figure 12:
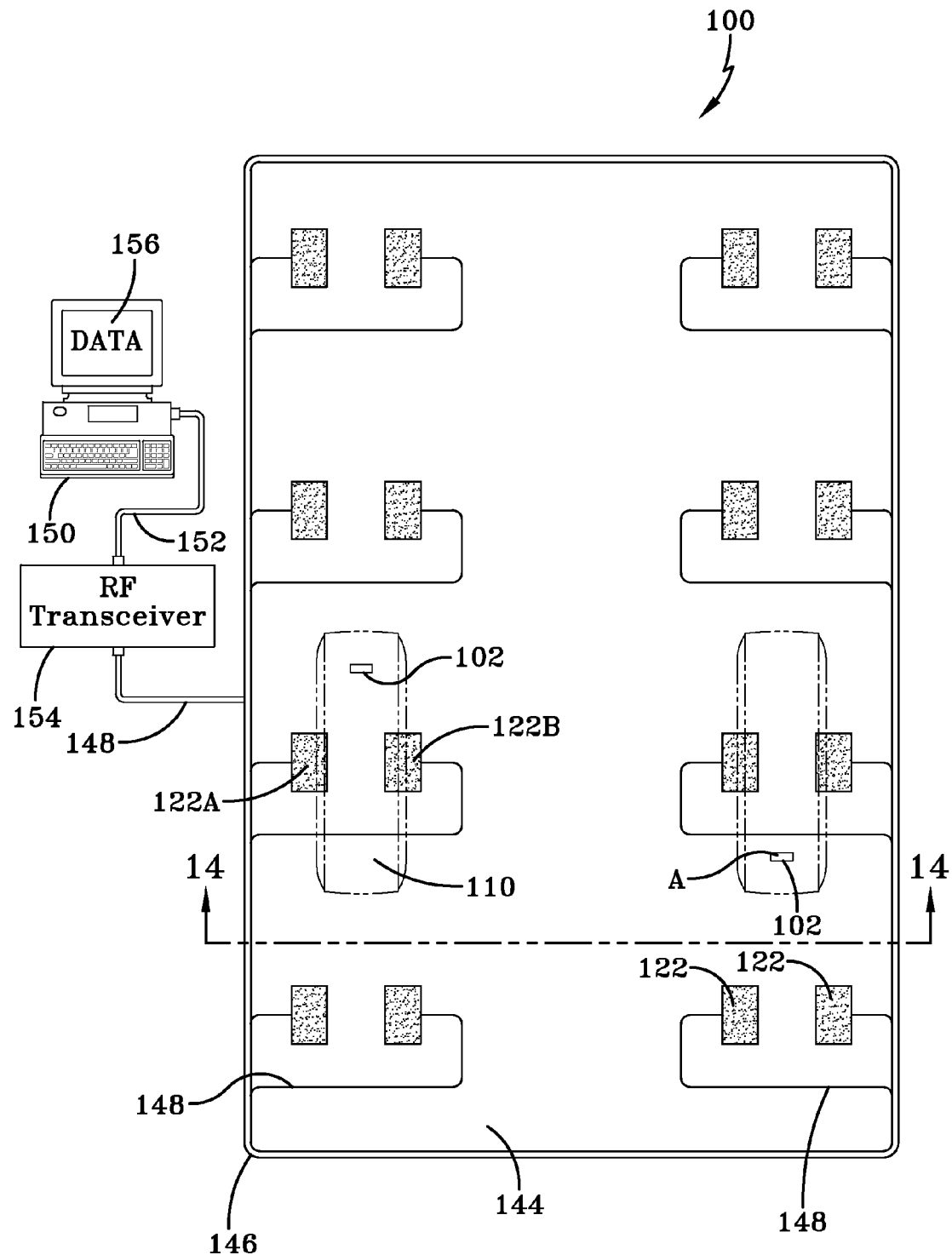
FIG. 12 is a schematic view of an identification-data reader system configured pursuant to the invention.

With reference to FIGS. 1 and 12, an integrated read station 40 for a wheel mounted vehicle is shown as including multiple data-receiving systems 10, 100. The systems 10, 100 may be employed alternatively or in combination for the purpose of facilitating the transfer of data from a vehicle with the vehicle positioned within the read station. The read station has particular application in fleet management of tractor/trailers but may be useful for other applications if desired. The read station data systems include a monitored parameter-data transmission system 10 and an identification-data system 100 as will be explained.

The monitored parameter-data transmission system 10 may be used to facilitate the transfer of data from a vehicle mounted monitoring device to a receiver disposed within the read station. One or more monitoring device(s) may be deployed on the vehicle or attached to wheel unit(s) of the vehicle. The monitoring device(s) may include sensor devices that measure one or more vehicle parameters and transmit data indicative of the measured parameter to a processor. For example, without intent to limit the invention, the monitoring device(s) may be mounted to one or more wheel units of a vehicle such as a trailer and include a tire pressure measuring sensor.

The information-data transmitting system 100 may be used to facilitate data from an RFID tag or transponder mounted to the vehicle or to a vehicle wheel unit. Data from the RFID tag may include an identification of the trailer, the tire, the tractor, operator, owner, fleet information, etc. Downloading such information to a processor allows a fleet manager to correlate such information with the trailer and tractor so as to efficiently manage equipment utilization and location.

It will be appreciated that a tractor trailer may include a monitoring device and an RFID tag or only be equipped with one such type of device. Equipping the read station with both a monitored parameter-data transmission and information-data transmission capability accommodates reading data from vehicles that have one or both types of the data transmission devices. As will be explained, the configuration of the data transmission systems allows for a drive-over reading of data from the vehicle as the vehicle passes through the read station and over system antenna situation upon a read station pad. Efficiency in effecting an expeditious transfer of data in a minimal amount of time is thereby facilitated.

Figure 2:
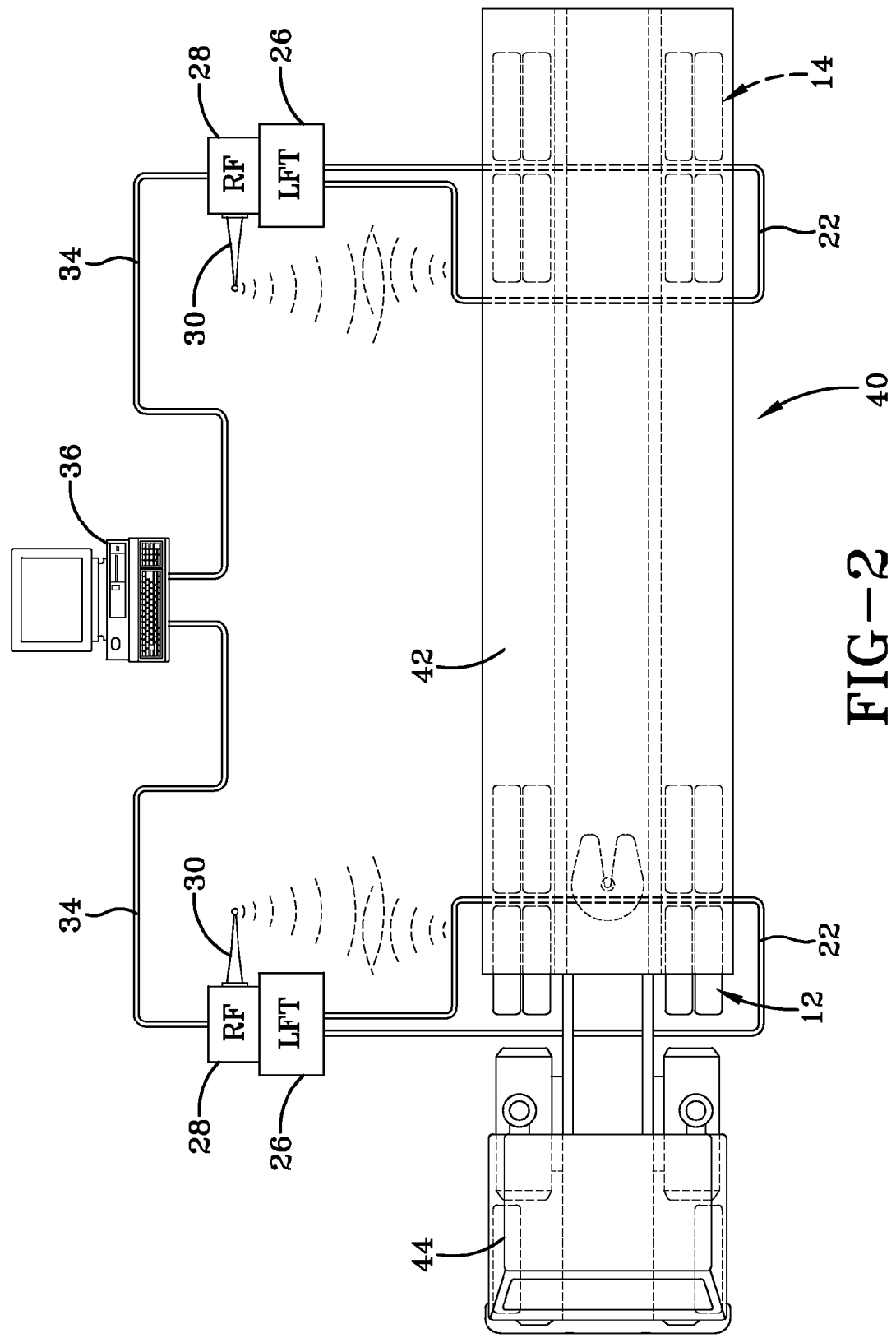
FIG. 2 is a top plan view of a coupled tractor-trailer utilizing the monitoring system of claim 1.
Figure 3:
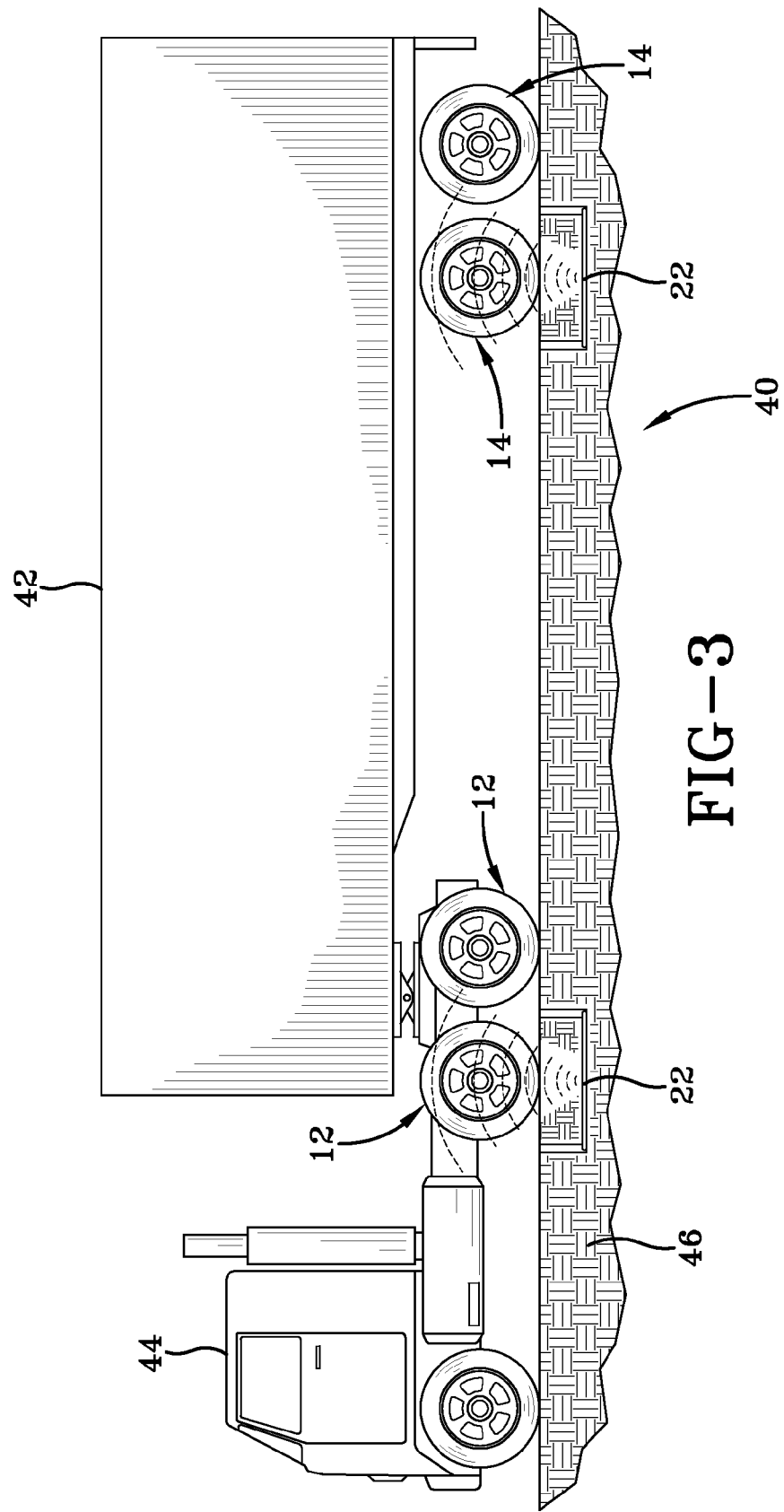
FIG. 3 is a side elevational view of a coupled tractor-trailer utilizing the monitoring system.
Figure 4:
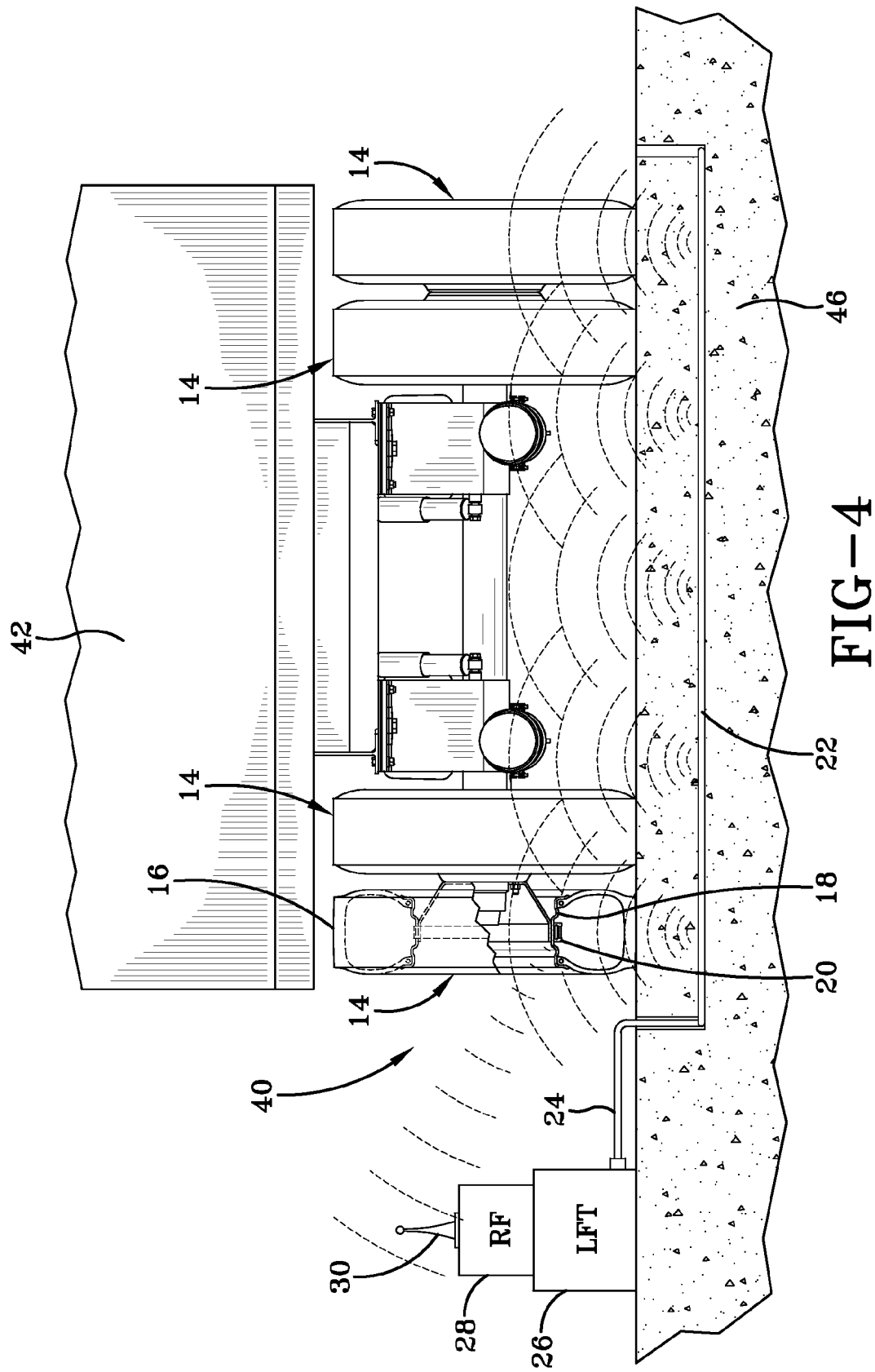
FIG. 4 is a. rear elevational view of a coupled tractor-trailer utilizing the monitoring system.
Figure 5:
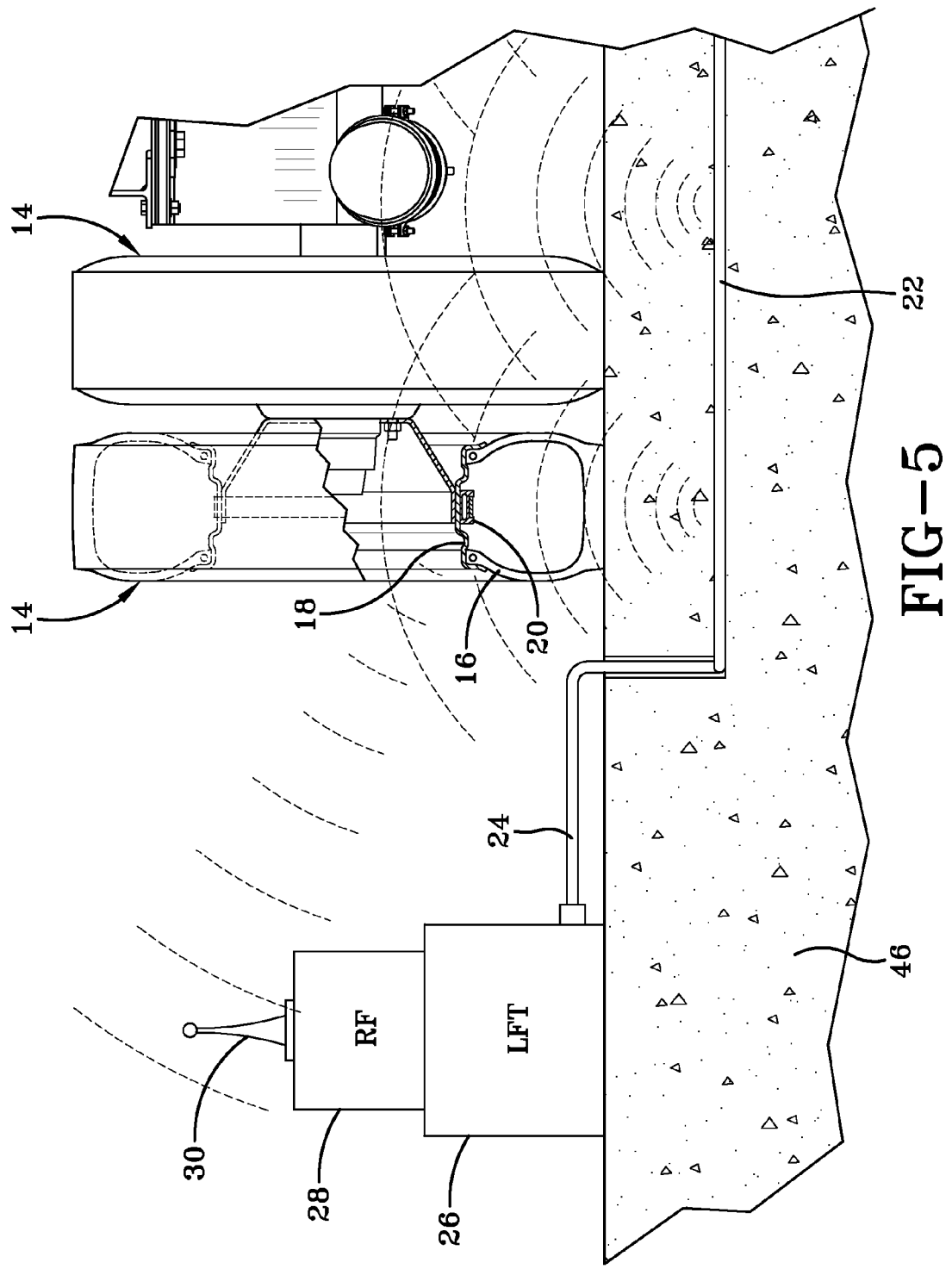
FIG. 5 is an enlarged view of a portion of the elevational view of FIG. 4.

Referring FIGS. 1, 2, and 3, the monitored parameter-data transmission system 10 is shown in schematic representation for use in monitoring one or more parameters from forward and rearward pairs of wheel units 12, 14. While four wheel units are represented, more or fewer monitored wheel units may be employed. Each wheel unit 12, 14 includes a tire 16 mounted to a wheel rim 18 and one or more monitoring devices 20 mounted to either the tire 16, such as by means of a patch adhesively attached to the tire inner liner, or the wheel rim 18. As shown in FIG. 2, the subject monitoring system finds particular application in the monitoring of wheel units in a coupled tractor-trailer 44, 42 as will be explained. However, the invention is not intended to be so limited and the monitoring of wheel units on other types of vehicles in other applications is also within the scope of the invention.

The monitoring device 20 is of a type employing one or more application specific integrated circuits and one or more sensor devices that deploy to measure certain tire parameters such as air pressure and temperature. In addition, the integrated circuit(s) may include memory programmable to store vehicle specific, tire specific, cargo specific, and/or itinerary specific information. A device having such capability is commercially available in the industry such as but not limited to OE part number 6G921A159BA and Replacement part number S180014791Z manufactured by Continental AG. The device 20 is of a type used in tire pressure monitoring systems in use in commercial or passenger vehicles and preferably includes one or more sensors for detecting certain tire parameters such as tire cavity air pressure and/or temperature. In addition, data identifying the tire, the wheel unit, the vehicle, the identity, source and destination of cargo carried by the transport vehicle may be stored as data within the device 20 to be accessed as needed or desired. The device 20 includes an RF transmitter and logic for transmitting data relating to measured tire parameters and/or stored reference data to a remote receiver for analysis and display. The device 20 may be packaged as a patch and affixed to an inner liner of the tire 16 or as an assembly attached to the wheel rim 18. The device 20 further includes a receiver and logic for receipt of an initiation signal from a source external to the wheel units 12, 14. The transmission of data from the device 20 to a remote receiver is in response to receipt of the initiation signal. Thus, operationally, the data transmission circuitry of device 20 conveying tire/vehicle data to an external reader is activated by the receipt of an externally originating initiation signal by a receiver within the device 20.

One or more Low Frequency (LF) antennas are positioned at locations suitable for operationally delivering an LF initiation signal to one or more wheel units 12, 14 of a vehicle as the vehicle drives through a service station 40. The LF antenna(s) in the embodiment shown are of a loop configuration, each formed by one or more LF antenna loop(s) 22. The LF antenna loops 22 in the embodiment of FIGS. 1-6 may be embedded within a ground pad 46 located in the service station 40. Positioned adjacent to the ground pad 46 in operational proximity to the monitoring device 20 is an RF receiver 28 including an RF antenna 30. The receiver antenna 30 receives data transmission from the one or more vehicle monitoring devices 20 mounted to the wheel units 12, 14. The vehicle may be repositioned sequentially within the service station 40 to allow each monitoring device 20 to be sequentially brought into initiation signal range of a single LF antenna, whereupon each device 20 is activated and placed into a data transmitting mode for data transmission to the receiver 28. Alternatively, multiple receiver/antenna pairs 28 may be positioned within the service station 40, each assigned to receive data transmission from one or more respective monitoring devices 20 of the vehicle. Employment of multiple RF receiver/LF transmitter pairs within the station reduces the time required for the data transmission to be completed. Whether sequentially or in unison, each monitoring device 20 of the vehicle, in response to an LF initiation signal, may be activated to transmit RF encoded data to the receiver 28.

The LF loop antenna 22 is electrically connected by conductor 24 to an LF transmitter 26. RF receiver 28 is coupled to RF antenna 30 and receives the RF transmission of data from one or more assigned devices 20. The RF receiver may be coupled to an output device, such as display screen 32 that is useful in visually conveying information to an operator. In addition, data from the receiver 28 may be transmitted via connection 34 to a data processing system such as computer 36 for further processing and sharing of the data along output lines 38 to other terminals.

As used herein, "vehicle" is used in its generic sense as encompassing any wheel based mobile transport mechanism. The "vehicle" may, by way of example, consist of a passenger automobile or a cargo-transporting tractor/trailer tandem such as depicted in FIGS. 3-19. Other types of vehicles known in the art can likewise utilize the invention. The vehicle shown in FIGS. 3-19 includes a multi-axle trailer 42 coupled to a tractor 44. The front and rearward tire units 12, 14 of the trailer 42 are equipped with a monitoring device 20 as described. Additionally, if desired, the tires of the tractor 44 may include a monitoring device 20. The LF loop antenna 22 is embedded within a ground pad 46 that is located in a read station 40. The read station 40 may be located wherever practical, optimal, or convenient to suit the user. For example, the read station 40 may be located proximate a gate through which trailers depart from a fenced secured area. Alternatively, or in addition thereto, the read station 40 may be located where the wheel units 12, 14 in a fleet are serviced. A read station 40 may also be located at the destination where cargo is loaded or unloaded from a trailer. In short, one or more read stations 40 may be deployed wherever a data download from the vehicle or vehicle wheel units is desirable, useful, or beneficial.

The tractor and trailer are moved into the read station 40 until a target wheel unit is positioned within operational proximity to the LF transmitter 26, on top of the LF antenna 22. The monitoring device of the wheel unit is thereby positioned to receive the LF initiation signal that initiates the RF transmittal of data to the RF receiver 28 by means of RF antenna 30. At the conclusion of data transmission, the vehicle may be moved to position another wheel unit into operational proximity to the LF transmitter. The sequence may be repeated until data from some or all of the monitoring devices is received as desired. The vehicle, at the conclusion of data transmission from its monitoring devices, may be moved out of the service station 40, clearing the station for admission by another vehicle.

Figure 6A:
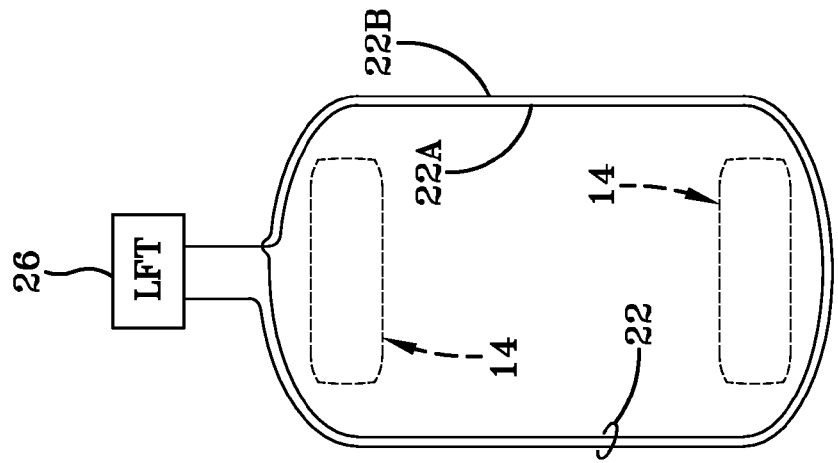
FIG. 6A is a top schematic diagram of the initiation signal generator shown in an in-ground, rectangular, two loop configuration.
Figure 6B:
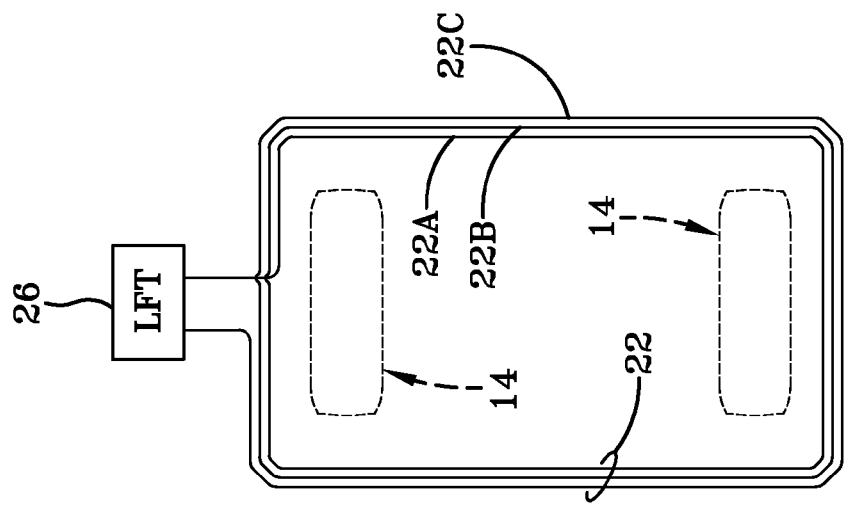
FIG. 6B is a top schematic diagram of the initiation signal generator shown in an alternative rectangular, three loop configuration.
Figure 6C:
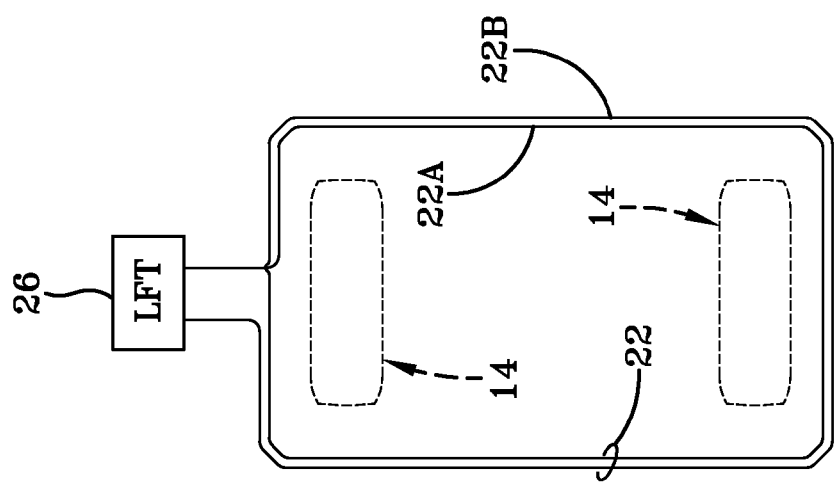
FIG. 6C is a top schematic diagram of the initiation signal generator shown in a second alternative ovular, two loop configuration.

The LF antenna 22 may be embedded in the read station pad 46 as described above. So positioned, the antenna is protected from impact with external objects and is optimally positioned below the monitoring device 20 and wheel unit that is to be accessed. The antenna 22 may be in the form of a single loop or a plurality of loops as will be appreciated from FIGS. 6A-6C. Other loop antenna configurations known within the industry may also be deployed. FIG. 6A shows a loop antenna in an in-ground, rectangular, two loop 22A, 22B configuration. FIG. 6B is a variation showing an alternative rectangular, three loop 22A, 22B, 22C antenna configuration. FIG. 6C shows a second alternative ovular, two loop 22A, 22B antenna configuration. It will be appreciated from FIGS. 6A-6C that the footprint defined by the antenna 22 may be sized to align with only a singe wheel unit 14 or may, as shown, be sized to surround multiple wheel units of a vehicle. The LF transmitter 26 is positioned to the side of the ground pad 46 into which the LF antenna 22 is situated.

Figure 7:
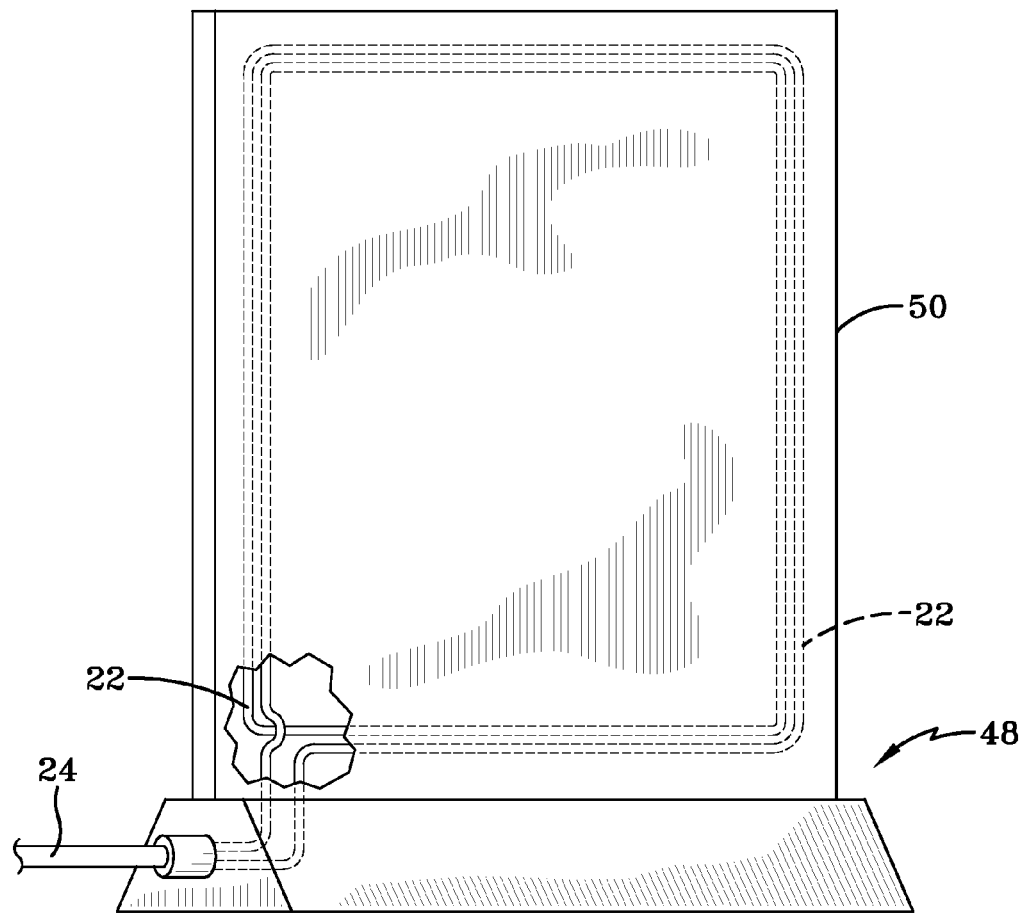
FIG. 7 is front perspective view of the initiation signal generator shown in a freestanding rectangular, two loop configuration.
Figure 7A:
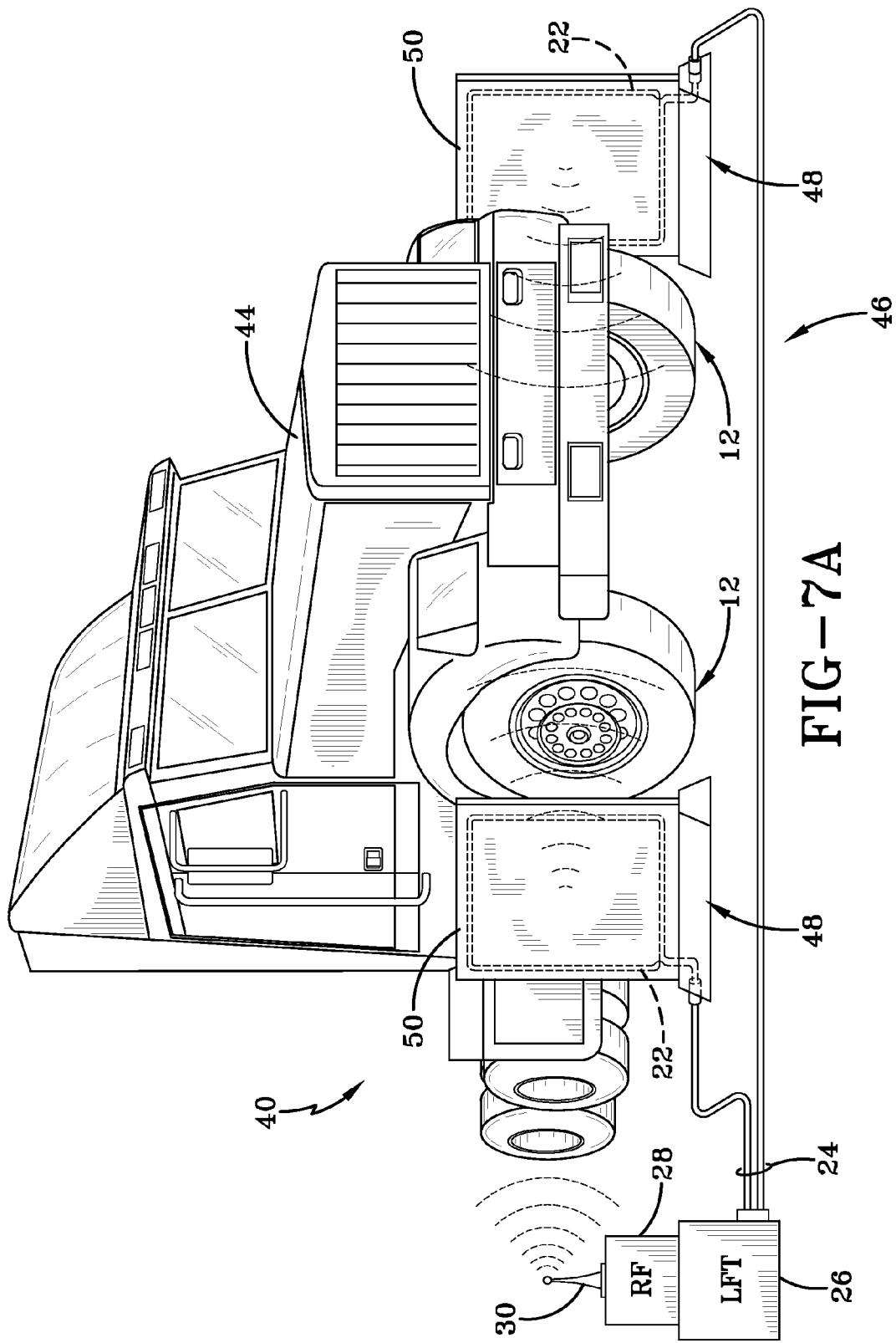
FIG. 7A is a perspective schematic diagram of the service station having an initiation signal generator configured pursuant to FIG. 7.

The in-ground drive-over configuration and positioning of the LF antenna 22 shown in FIGS. 1-6C inclusive may be employed or alternative antenna configurations and locations may be used if desired. Delivery of an initiation signal to the monitoring device 20 that activates data transmission from the device 20 to the RF receiver 28 may be effected by alternative LF antenna configurations and locations. By way of example, without intent to delimit the invention, an alternative upright panel LF antenna configuration is shown in FIGS. 7 and 7A. A vertically oriented, freestanding panel assembly 48 includes a support panel 50 that encases the LF antenna loop(s) 22 and maintains the antenna in an orientation toward the ground pad 46 in the read station 40. More than one of the assemblies 48 may be utilized and positioned opposite sides of a vehicle moved into the station 40 as shown in FIG. 7A. As described previously, the LF transmitter 26 through antenna assembly(s) 48 emits an initiation signal detected by a monitoring device in wheel unit 12. Upon receipt of the initiation signal, the device is activated to transmit data relating to certain tire parameters such as air pressure and temperature. In addition, the integrated circuit(s) within the device may include memory programmable to store vehicle specific, tire specific, cargo specific, and/or itinerary specific information that is RF transmitted to the receiver 28. The transmitted data may be recorded and stored as well as displayed to an operator. The wheel units 12, 14 and the tire components therein may thereby be identified and correlated against the identity of the trailer 42 and tractor 44 to ensure that the proper wheel units are still on the vehicle. In addition, the identity, origination, and destination of the cargo transported by the trailer may be stored in the wheel unit and transmitted to the receiver 28 to verify proper shipment of goods. The use of freestanding assemblies 48 provides flexibility in allowing adjustment to the orientation and spacing of the LF antenna within the service station 40. Adjustment of the LF antenna may prove beneficial to correlate the position and spacing of the LF antenna(s) with the orientation and wheel unit spacing of a particular vehicle in the station 40.

Figure 8:
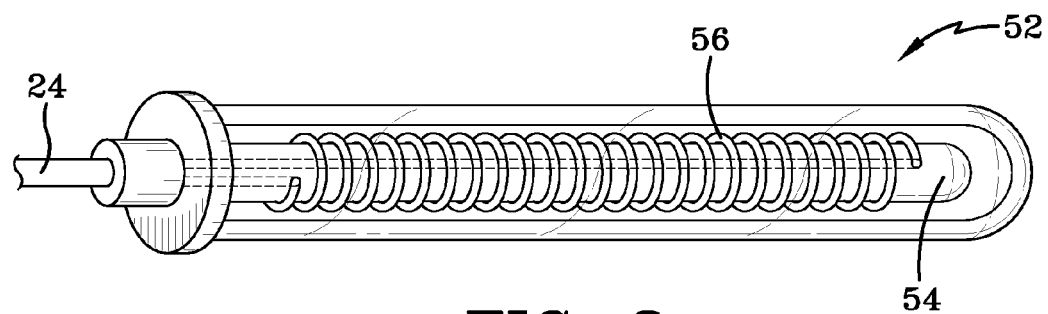
FIG. 8 is a front perspective view of the initiation signal generator shown in a wound ferrite rod configuration.
Figure 8A:
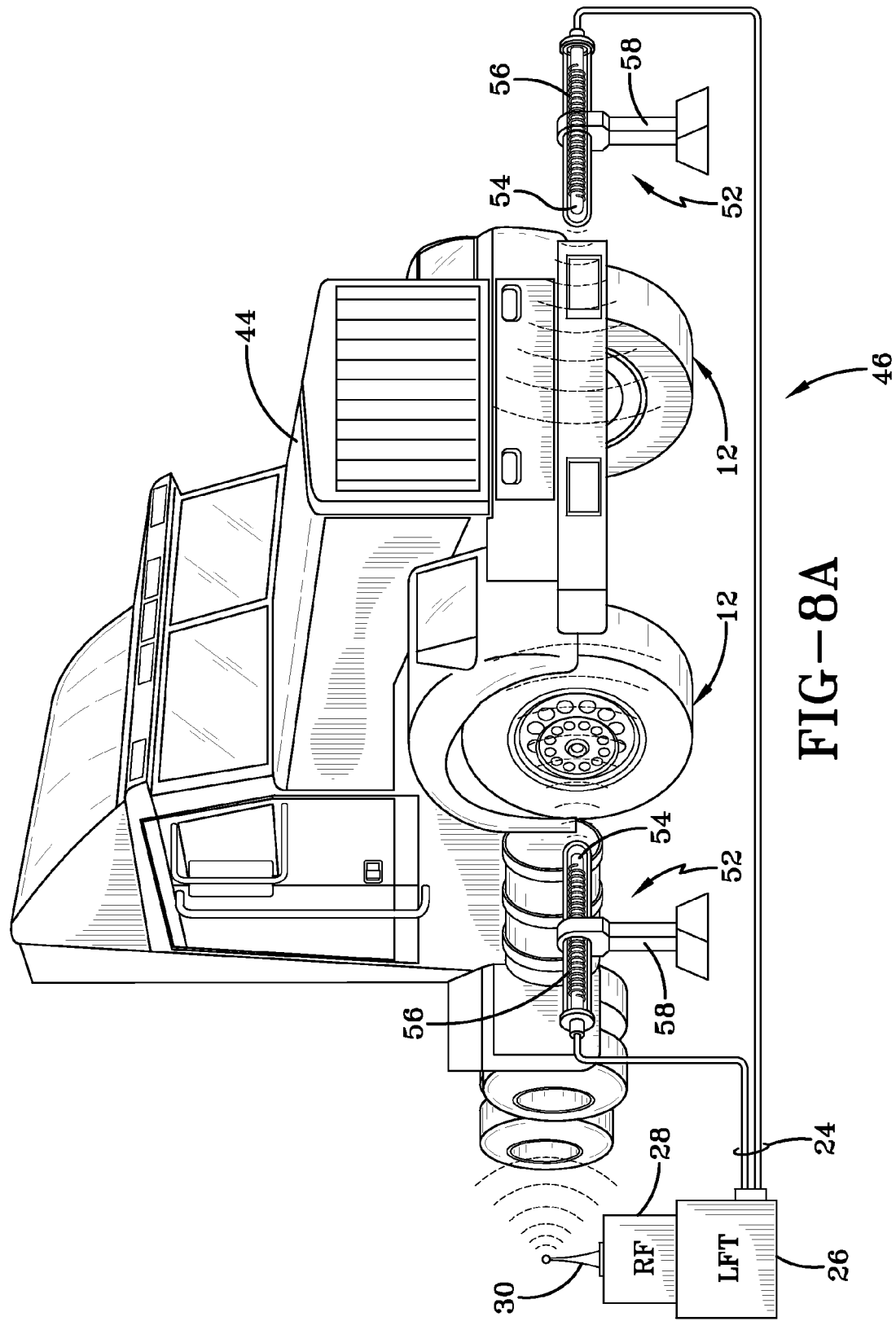
FIG. 8A is a perspective schematic diagram of the service station having an initiation signal generator configured pursuant to FIG. 8.

FIGS. 8 and 8A show another alternatively embodied LF system in which one or more rod assemblies 52 are positioned adjacent the wheel unit(s) 12 of a vehicle within the read station 40. Each rod assembly 52 includes a ferrite rod 54 surrounded by a winding 56 in a freestanding stand unit 58. As with the panel assemblies 48, more than one assembly 52 may be utilized and positioned on opposite sides of a vehicle within the station 40 as shown in FIG. 8A. The LF transmitter 26 through antenna assembly(s) 52 emits an initiation signal detected by one or more monitoring devices in the vehicle wheel units. Transmission of tire parameter measurement data and/or vehicle specific, tire specific, cargo specific, and itinerary specific information upon initiation may be made to the receiver 28. As with the panel assemblies 48, the units 52 provide flexibility in allowing potentially beneficial adjustment to the orientation and spacing of the LF antenna within the read station 40.

From the foregoing, it will be appreciated that the read station 40 may be constructed in locations beneficial to the exchange of data between the monitoring device(s) 20 and external data processing and display devices. The stationary system 10 generates a low frequency magnetic field that stimulates a transmission from one or more wheel units of a vehicle that may be part of a tire pressure monitoring system (TPMS). The stationary system also receives and decodes the data message from the wheel unit(s) and may provide a service indicator to the driver and a digital message to the fleet management system. The system consists of the LF function generator capable of modulation consistent with the TPMS specifications. The LF antenna(s) may be constructed in alternative configurations depending on the needs of a particular service station installation. For example, the LF antenna(s) may comprise a wire loop in the ground or a side panel of a wire wound ferrite rod. The RF transmission from the monitoring device(s) are received, demodulated and decoded by an operationally positioned RF receiver that may provide a digital output and/or driver display in the form of a digital screen or a light bar.

In a commercial trucking application, the subject read station(s) may be located where trailers are compounded. As a truck passes through an entry gate, for example, it may pass through a system read station 40. A read event could then be conducted that captures: the container identification including the goods being transported; the tractor identification; the trailer identification; and associated tire identification. The identity of the tires may then be compared against records in order to ensure that the same tires are on the trailer. In addition, the driver, upon verification of tractor, trailer, and cargo identities, can receive instruction on where to drop the trailer and/or cargo and what location to pick up the next trailer and/or cargo.

In practice, the subject monitored parameter-data transmission system 10 may be a drive through gate that instantly captures the relevant data and gives instructions to the driver. Manual identification of the tractor, trailer, and tires that can cause back-up lines and delay at dispatch centers can thereby be avoided.

Figure 9:
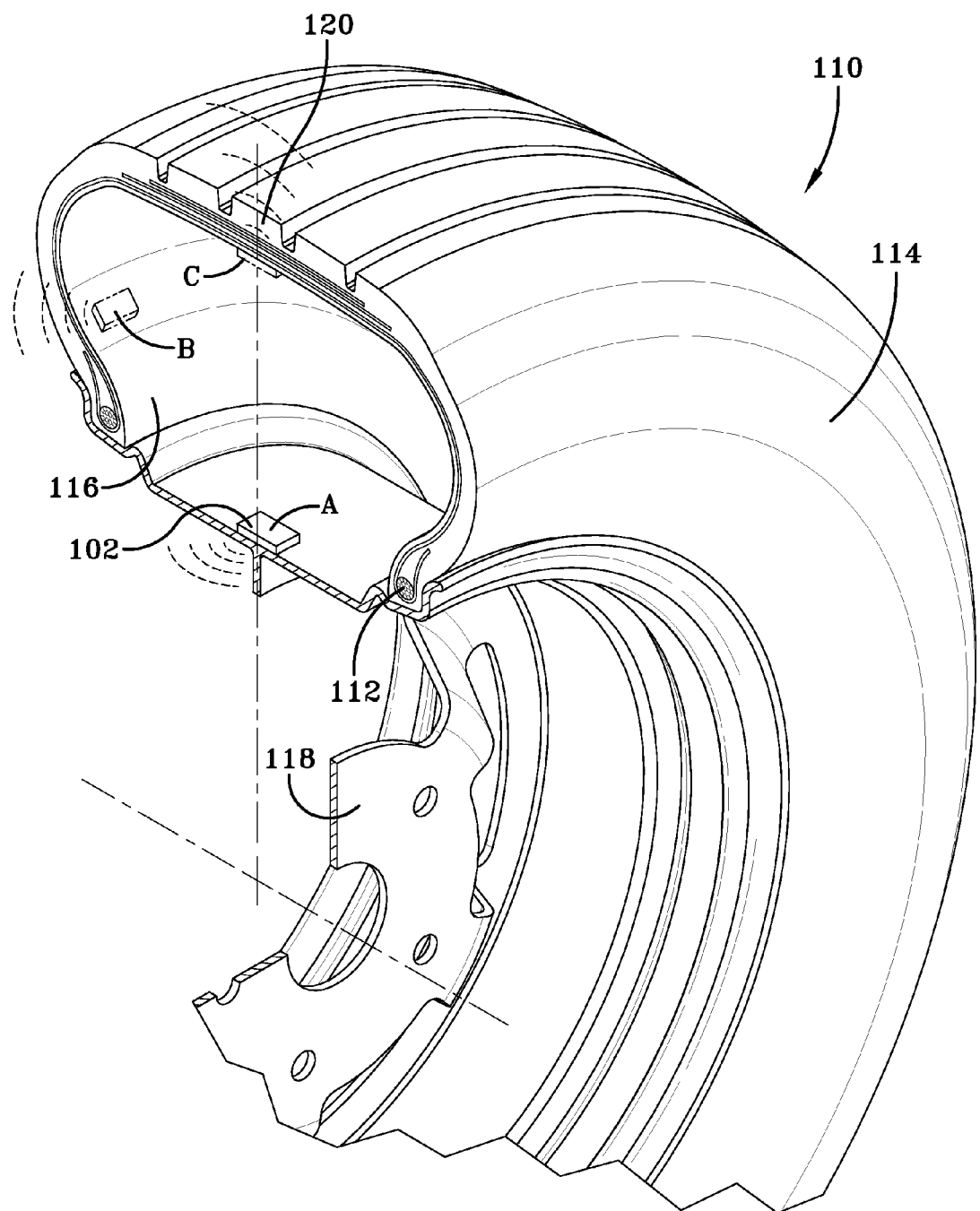
FIG. 9 is a partially sectioned perspective view of a wheel unit showing a transponder in alternative mounted locations.

With reference to FIGS. 9 and 12, a drive-over information data-transmission system 100 for a vehicle is schematically represented. The system 100 is intended to be situated within a read station 40 as described above, and used within the read station 40 alternatively with or in conjunction with a monitored parameter data-transmission system 10. The vehicle from which information data is downloaded within the station 40 has one or more wheel mounted transponder devices 102 as shown. As used herein, "transponder device" is used in its broad connotation and includes devices such as RFID tags and other devices for data storage and transmission. The information data-transmission system 100 is located within a read station 40 (FIG. 1) through which the vehicle is preferably, although not necessarily, is driven during a tag-reading operation. The vehicle transponder device(s) 102 may be mounted to a wheel unit 110 in a number of locations, such as those identified in FIGS. 9 and 12 as locations A, B, C. The wheel unit 110 includes a tire of conventional construction having a pair of beads 112, a tire carcass 114 extending between the beads 112, a tire crown region 120, and a tire inner liner 116. The tire is mounted to a wheel rim 118 in conventional fashion. One or more wheel units 110 of a vehicle may be provided with one or more transponder devices 102.

Alternative locations for a transponder device in a respective wheel unit 110 may be utilized such as at locations A, B, and C. In addition, other mounting locations may be utilized within the wheel unit 110 to suit the needs and system requirements of the user without departing from the invention. Location A mounts the transponder device to center surface of the wheel rim 118 as shown. Alternative location B locates the transponder against a sidewall portion of the inner liner 116 of the tire while location C positions the transponder against a crown portion of the inner liner 116. While only one transponder device is generally used per wheel unit, multiple transponder devices may be deployed and utilized within a single wheel unit if desired. For example, a transponder device may be positioned at all three locations A, B, and C if desired. The transponder device is of a type common within the industry combining data storage and transmission capability initiated by receipt of RF signal. Upon activation, the transponder transmits an RF data stream to a remote RF receiver. The stored data may include pertinent information that a user would find beneficial to monitor in the operation of a vehicle or a commercial fleet, such as an identification of the vehicle, the tire, the wheel unit, and/or the cargo conveyed by the vehicle and its destination. The RF transponder may be read-only or may include read-write capability.

Figure 10:
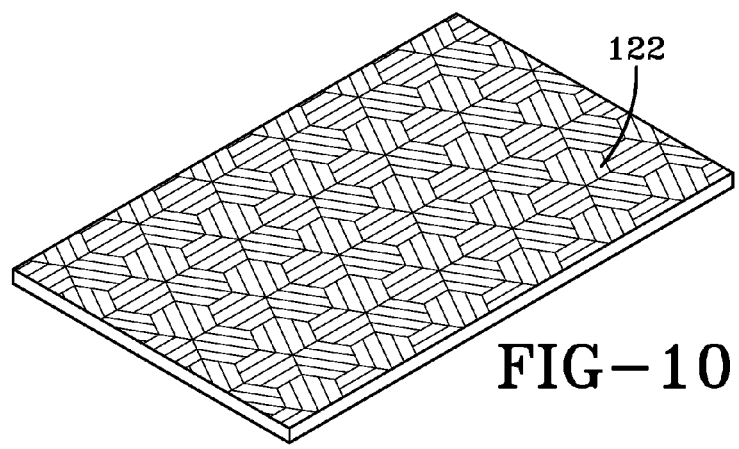
FIG. 10 is a front perspective view of an antenna device configured pursuant to the invention.
Figure 11:
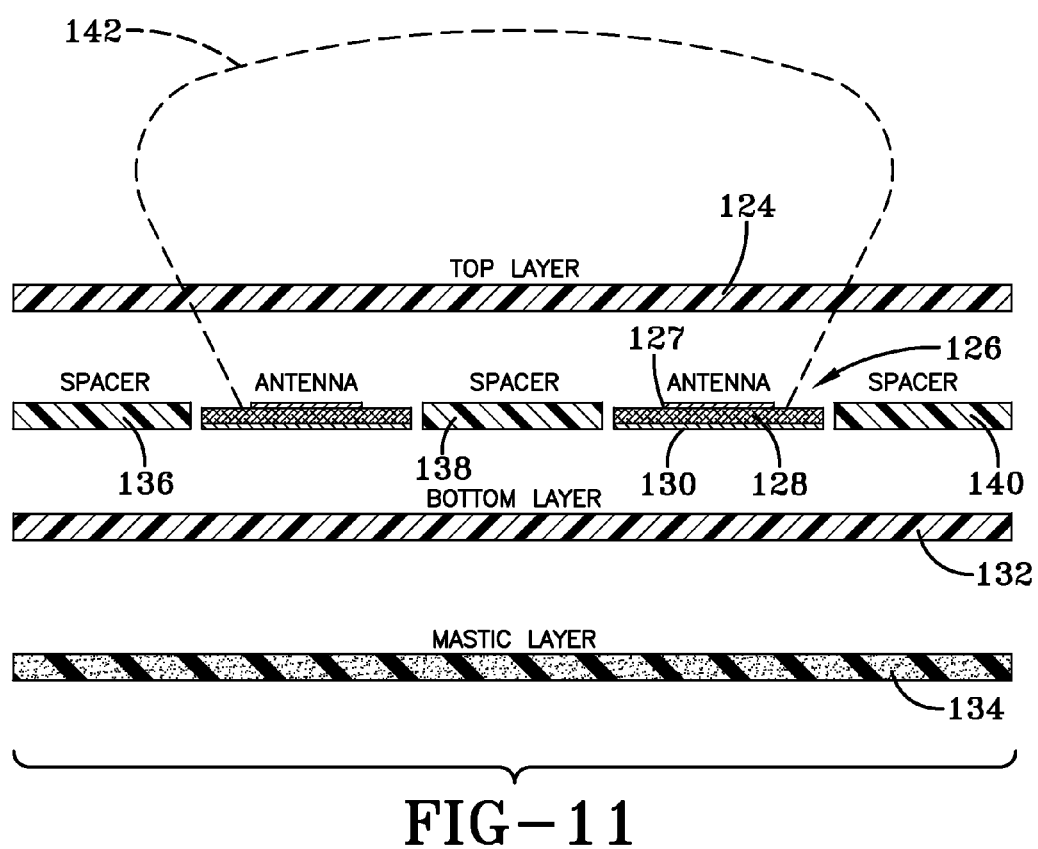
FIG. 11 is a cross-sectional view through the antenna device of FIG. 10.

Referring to FIGS. 10, 11, and 12, one or more relatively flat panel antenna devices 122 are deployed in the read station 40. The antenna device(s) 122 are of layered configuration preferably ranging in thickness from 0.5 to 1.0 inches. Each device 122 is structured having a top layer 124 formed of a material providing adequate antenna protection such as a thermoplastic material. Positioned below the top layer 124 is a loop antenna assembly 126. The loop antenna assembly 126 includes a conductive top plate 127 of relatively smaller width; a dielectric layer 128 positioned beneath the top plate 127; and a conductive plate 130 of wider dimension. The antenna assembly 126 is constructed functionally as a capacitor for creating an upwardly directed electro-magnetic field 142. Situated adjacent to the antenna assembly 126 are spacer members 136, 138, 140 that maintain the gap between the top layer 124 and a bottom layer 132. The bottom layer is formed of a material providing a smooth upper surface and adequate protection for the antenna assembly 126. At the bottom of the antenna device 122 is a mastic layer 134 formed from mastic material suitable for filling in the low spots of the pad on which the assembly 122 is mounted.

An array of the antenna devices 122 may be situated within the station 40 in various configurations such as the representative configuration of FIG. 12. The antenna array contains multiple antenna devices 122 and connections therefore on a read station pad 144 in a predetermined spacing. The read station pad 144 is preferably but not necessarily the same pad as pad 46 previously described. The predetermined spacing operatively aligns an electromagnetic field from each antenna device 122 with a respective wheel unit transponder 102 when the wheel unit is positioned over or driven over the transponder. One antenna device 122 may be paired with each wheel unit transponder 102 or two or more antenna devices 122-A and 122-B may be positioned to align along the outer edges of a wheel unit 110 to operationally activate a respective antenna device 122 and receive identification data back from the device 122 as shown in FIG. 12. The field generated from a single antenna device or multiple antenna devices such as 122-A, 122-B operatively activate the wheel unit transponder 102 to initiate data transmission. Data from the wheel unit transponder(s) 102 are received by the antenna device(s) and relayed by connections 148 to an RF transceiver 154 connected at 152 to a data processing computer 150. A display 156 of information to a user is thereby facilitated.

Figure 14:
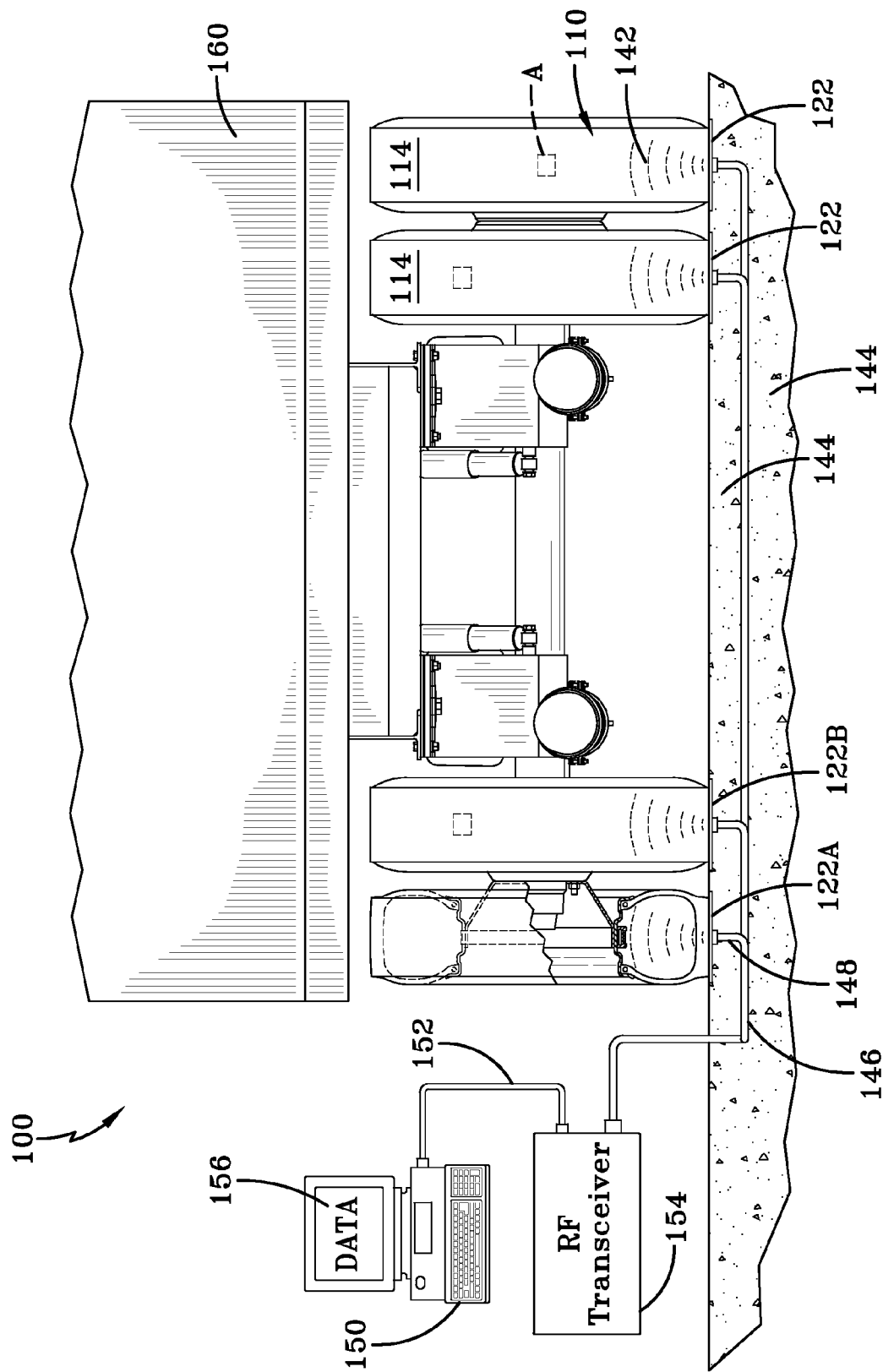
FIG. 14 is an end elevation view of a read station and tractor trailer in a read position within the station.
Figure 15:
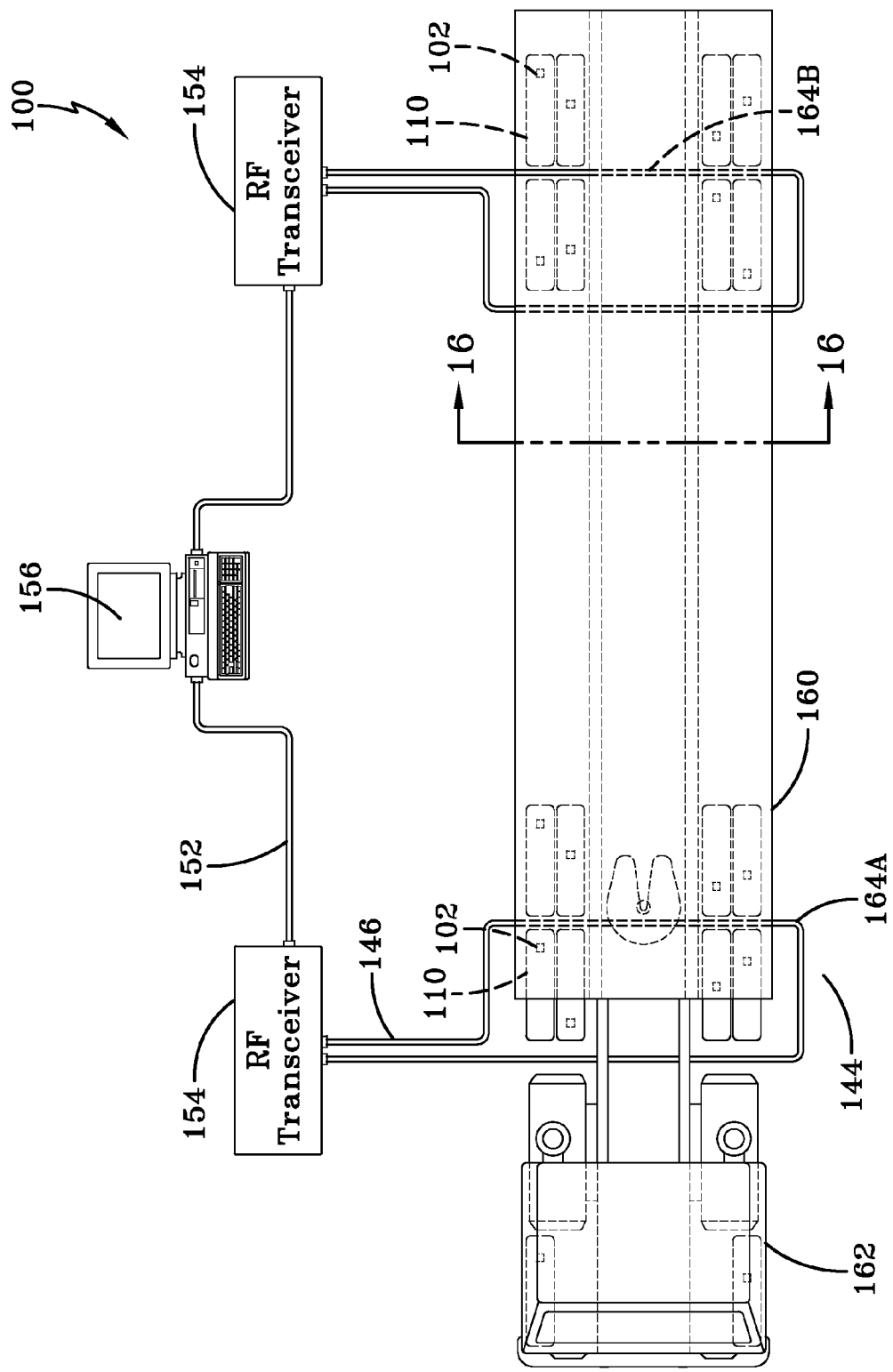
FIG. 15 is an alternatively laid out read station showing the position of the information-data transmission system relative to a tractor trailer.

It will be appreciated that the read station 40 employing data transmission system 100 may be utilized in a commercial trucking operation in conjunction with the previously described system 10 to monitor and identify a tractor 162 and a trailer 160 as shown in FIGS. 14 and 15. The antenna device(s) 122 are mounted to the pad 144 in a flat orientation. Each device may be secured within a recess within the pad 144 or secured by adhesive or other appropriate means to an upper surface of the pad. The relatively low profile of the antenna device 122 minimizes clearance issues with the mud flaps of the tractor and/or trailer as the tractor trailer tandem moves across the pad 144. In addition, mounting the device(s) 122 to the pad protects the antenna devices 122 from potential damage from contact with outside objects located on or adjacent to the pad 144. Moreover, a drive over reading of the transponders 102 may be facilitated by location of the antenna device(s) below the tractor trailer tandem, whereby reducing the time required in reading the stored data within each transponder 102. Efficiency of operation is thereby enhanced.

It will further be appreciated from FIGS. 14 and 15 that mounting the antenna devices 122 on or embedded within the pad 144 allows the reader to couple a field to the transponder mounted to the inside mounted tire of a dual tire system. Adjacent antenna devices 122 may be positioned directly beneath respective tires as shown to generate respective fields operationally coupling with the transponder 102 of each wheel unit as the vehicle moves across the pad. The mastic layer 134 at the bottom of each antenna device 122 operates to fill in low spots on the pad 144 and maintain the device 122 at a level attitude. The sandwich configuration of the device 122 as described able protects the antenna and provides support. The cover layer 124 may be formed of a durable plastic material having a thinner sectional thickness than the bottom base layer 132. The cover layer 124 and base layer 132 are preferably formed from a low dielectric loss (transparent) material. The field 142 created by the device(s) 122 is established above the antenna device(s) 122 to couple with a respective transponder device 102 as the wheel unit rolls through the electric field.

As a wheel unit 110 rolls across the pad 144 the transponder 102 of each wheel unit 110 moves with its wheel unit toward and away from the pad. By exposing the transponder 102 of each wheel unit 110 to multiple fields from an array of devices 122 as the transponder 102 rotates across the pad with the wheel unit, the probability of achieving a close proximal coupling of the transponder 102 with an electric field is enhanced. The efficacy of transponder to field coupling ensures an accurate and expeditious activation of each transponder 102 and reading of data transmitted therefrom.

Figure 13:
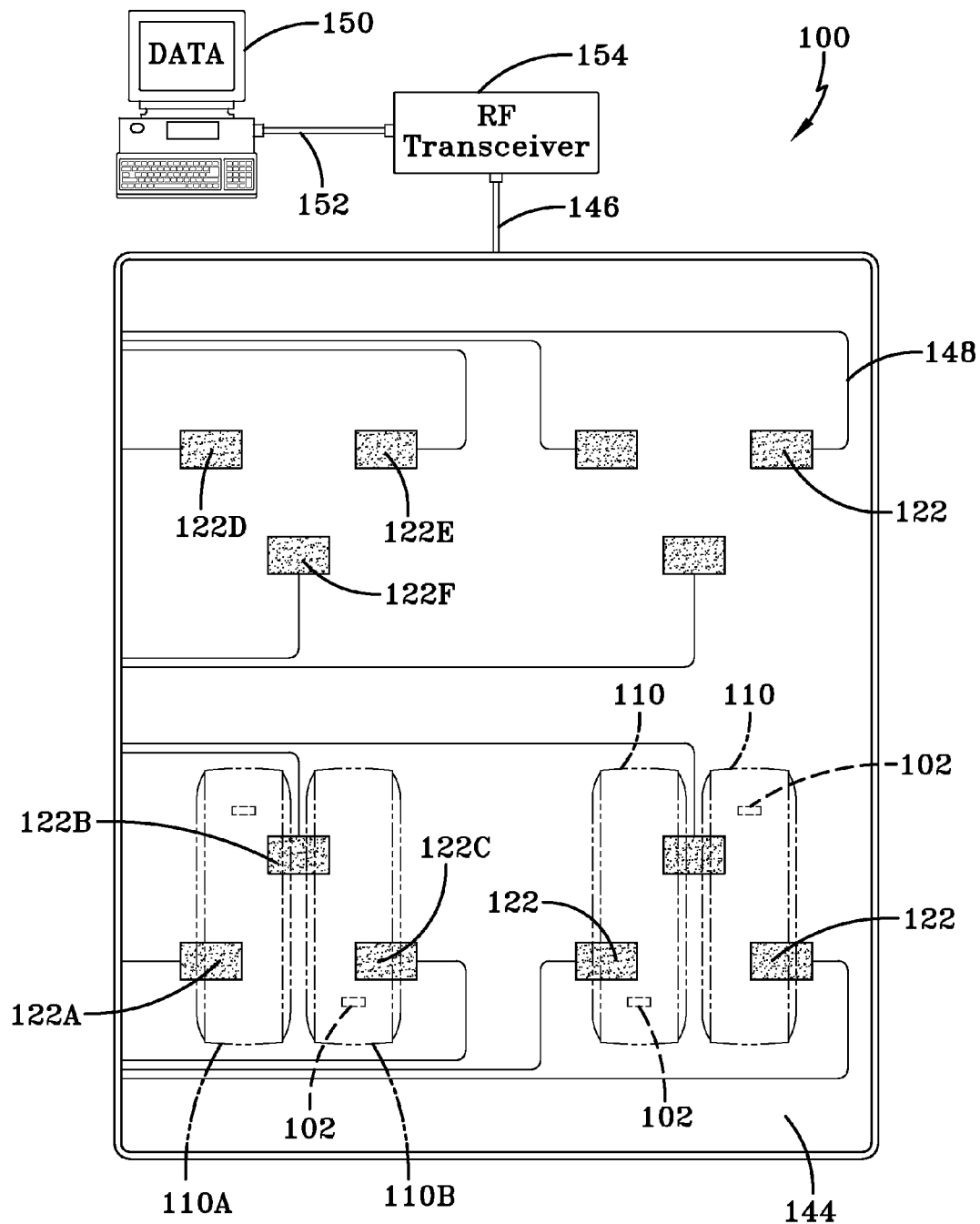
FIG. 13 is a schematic view of an alternative information-data reader system.

FIG. 13 shows an alternative array in which a repeating grouping of three antenna devices 122A-C is positioned across the pad 144. The antenna devices 122 are connected by electrical line 146 to an RF transceiver 154. The transponder 102 in each wheel unit 110 is activated by the electric field generated by the RF transceiver 154 transmitted through the antenna devices. Each of the wheel unit transponders responds with a transmission of data back through the antenna devices to the RF transceiver 154. The triangular grouping of antenna devices 122A-C is positioned to create a field that may couple with a transponder 102 in a tandem pair of wheel units 110. It will be seen that the antenna devices 122A and 122C align with an outer edge of a respective wheel unit 110A and 110B. The antenna device 122B is positioned to align with inward edges of the tandem wheel unit pair with the vehicle in a read position on the pad 144. A second grouping of three antenna devices 122D-F align with the tandem wheel units 110A, 110B and as a backup to ensure a positive data download as the wheel units 110A, 110B roll across the pad 144.

Figure 16:
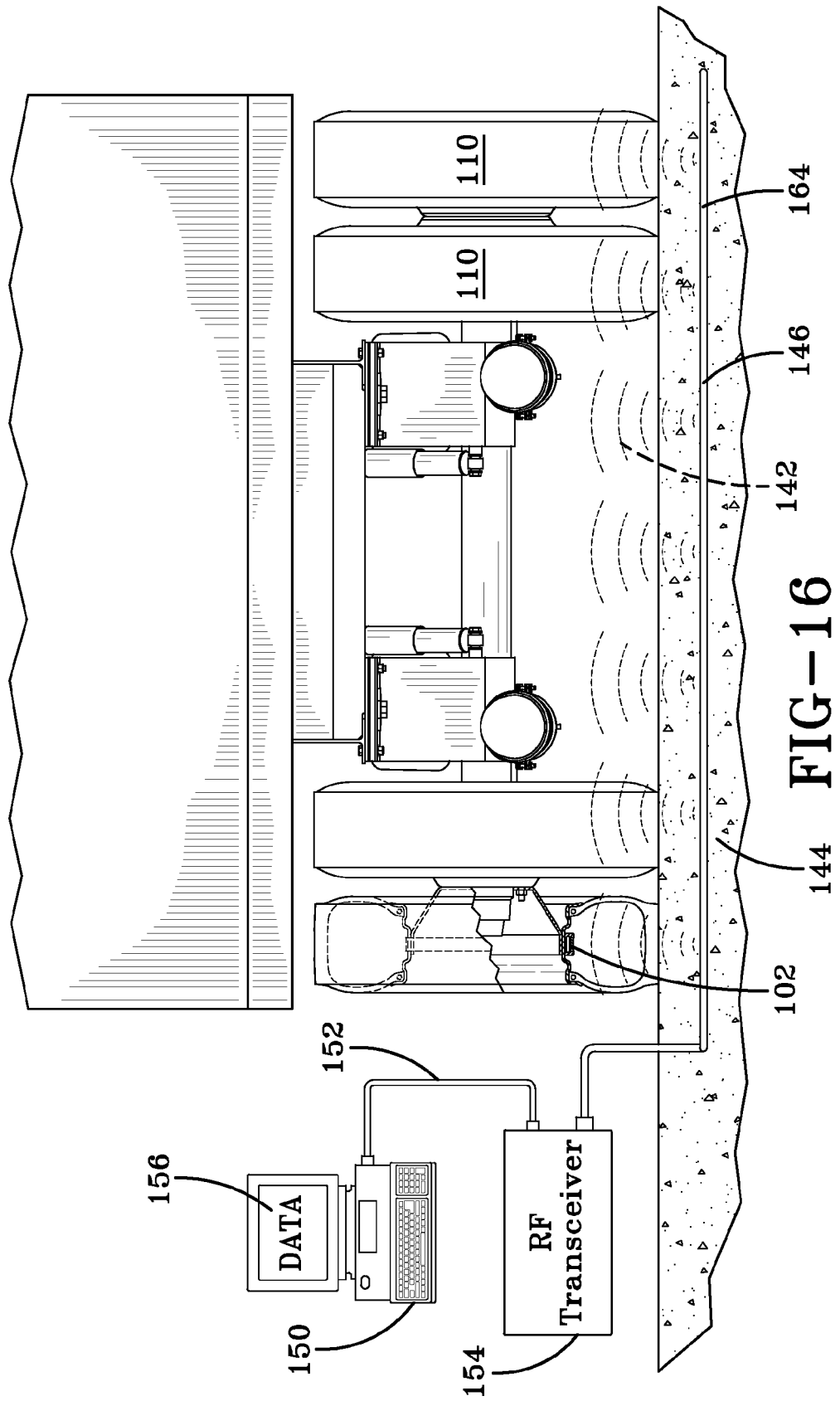
FIG. 16 is an end elevation view of an alternatively configured information-data transmission system shown with a tractor trailer in a read orientation within the station.

Referring to FIG. 15 and FIG. 16, an alternative system is shown in schematic in which the activation field for forward and rearward transponders 102 of wheel units 110 are generated by forward and rearward loop antennae 164A, B. The loop antennae 164A, B are positioned at forward and rearward read locations on the pad 144 and are positioned to generate a respective electric field that couples with the four vehicle wheel units. The field empowers the transponders 102 in each of the coupled wheel units 110 to transmit data back through connection 152 to RF transceiver 154 and to a data processing computer 156. As the tractor 162 and trailer 160 move across the pad 144 the rearward set of four wheel units will enter the generated field created by the loop antennae 164A, B, resulting in a transponder empowering signal and data transmission back from the transponder(s) in similar fashion. The receipt of data from the transponder 102 of each wheel unit 110 is thus facilitated in an expeditious manner as the tractor and trailer move through the read station.

The generation of an electric field for the purpose of powering wheel unit transponders may be effected by the use of antennae of various configurations in addition to those described above. For example, without intent to delimit the invention, an array of dipole antennae of the type illustrated in FIG. 19 may be wired into the pad 144 in locations similar to those described above including the layered antenna as in FIGS. 10 and 11. The dipole antennas 166 may be arranged in pairs or used in a line formation to generate the field tuned to empower transponder devices in the wheel units 110. The dipoles 166 may be embedded a distance into the pad 144 sufficient to protect the dipoles from damage during use. The dipoles 166 may be positioned to read tags on middle sides of dual tires or all tags. For a pad constructed of concrete material, the relative static permittivity $\in_r$ is 5-10. Depending on the application, dipoles 166 may be embedded in linear formation or triangulated as described. As the vehicle proceeds across the pad 144 and over the embedded dipoles, the tags 100 in the wheel units will couple with one or more dipole fields at a time. Additionally, a reflective screen 168 may be positioned beneath the dipoles 166 within the concrete pad 144 to direct energy from the dipole upward to optimize electrostatic field strength at the wheel unit tag.

Figure 17:
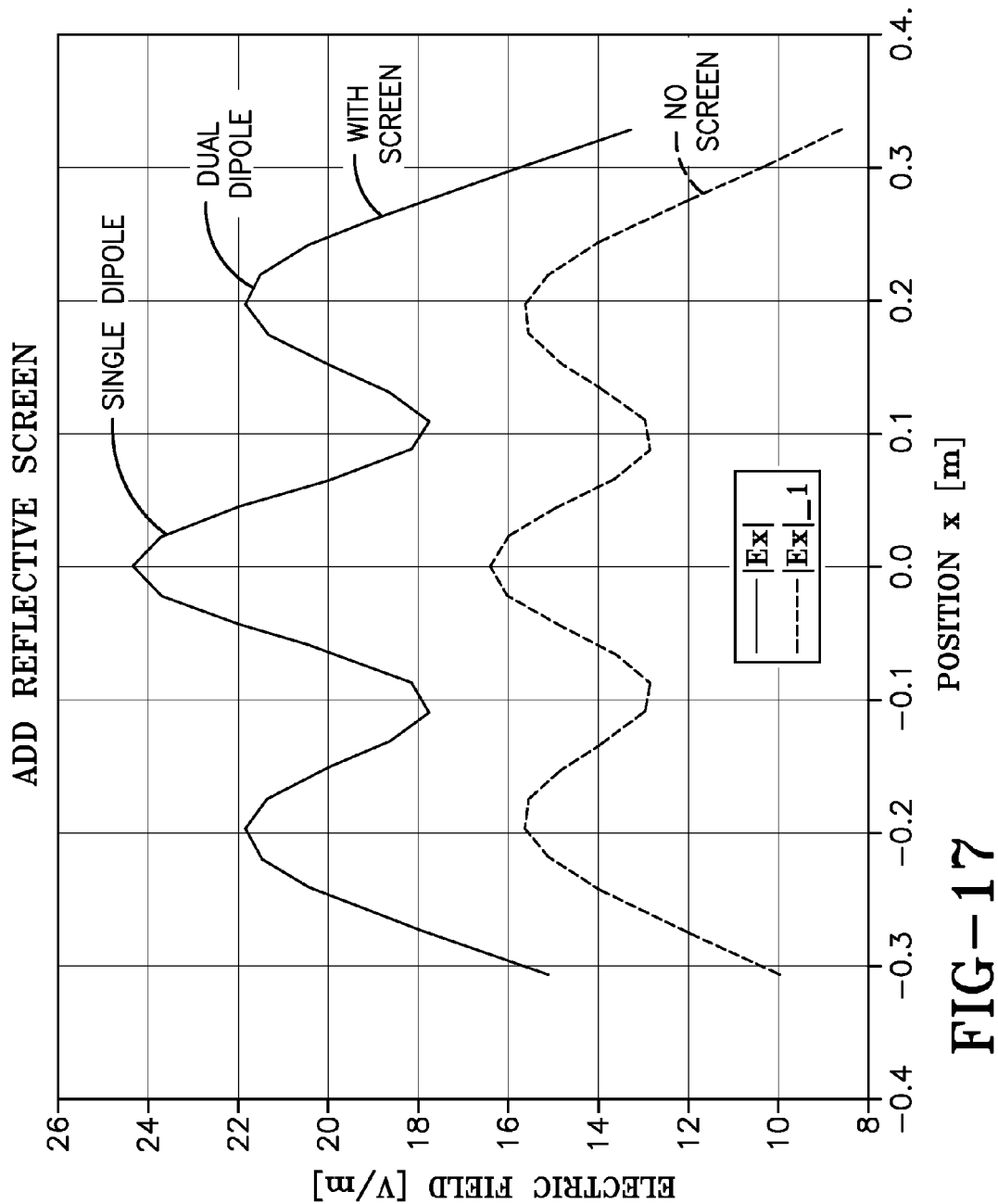
FIG. 17 is a graph of electric field strength at the RFID transponder graphed against the distance between the antenna device and RFID transponder with a reflective screen in operation.
Figure 18:
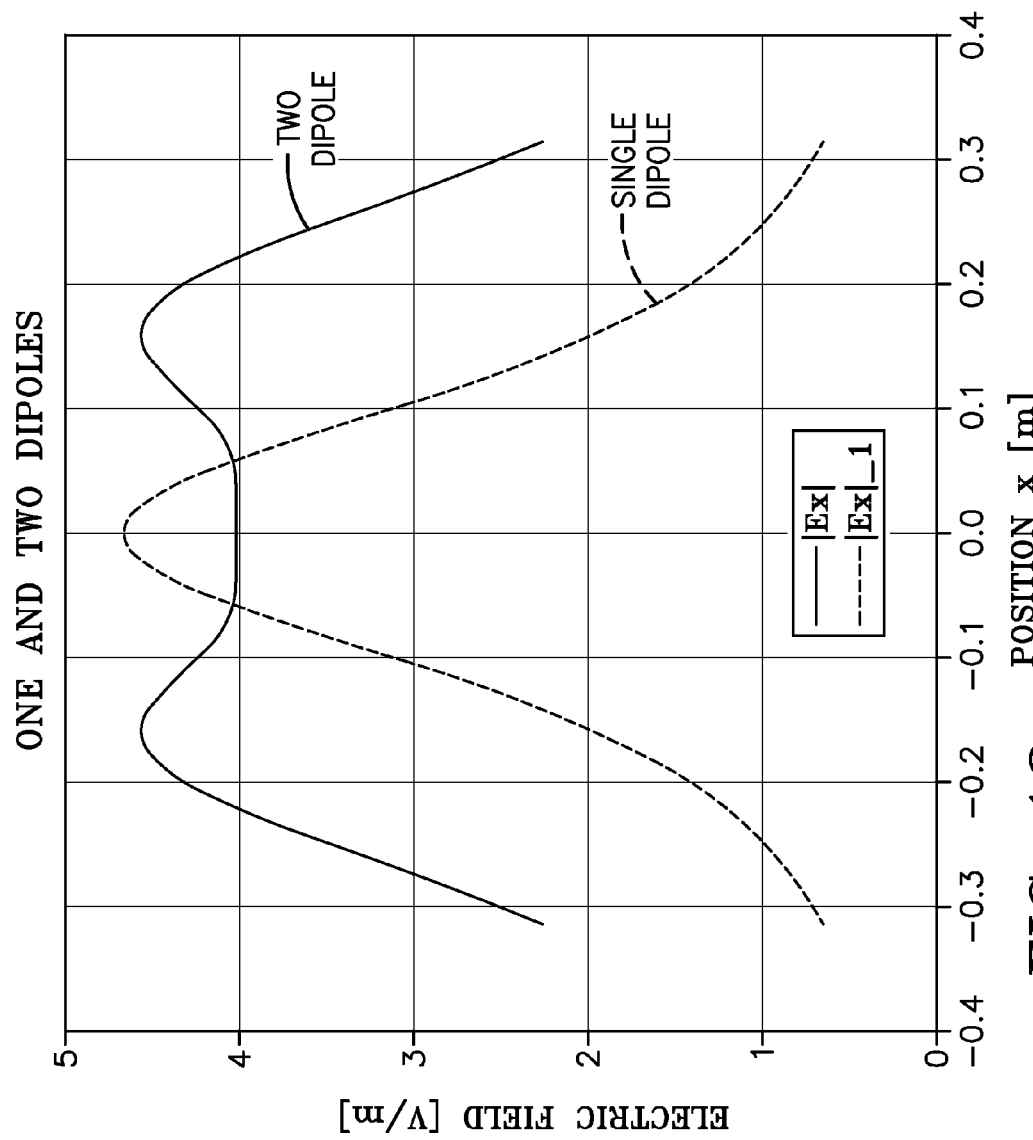
FIG. 18 is a graph of electric field strength at the RFID transponder from one and two dipole antenna systems graphed against the distance between the antenna device and the transponder.
Figure 19:
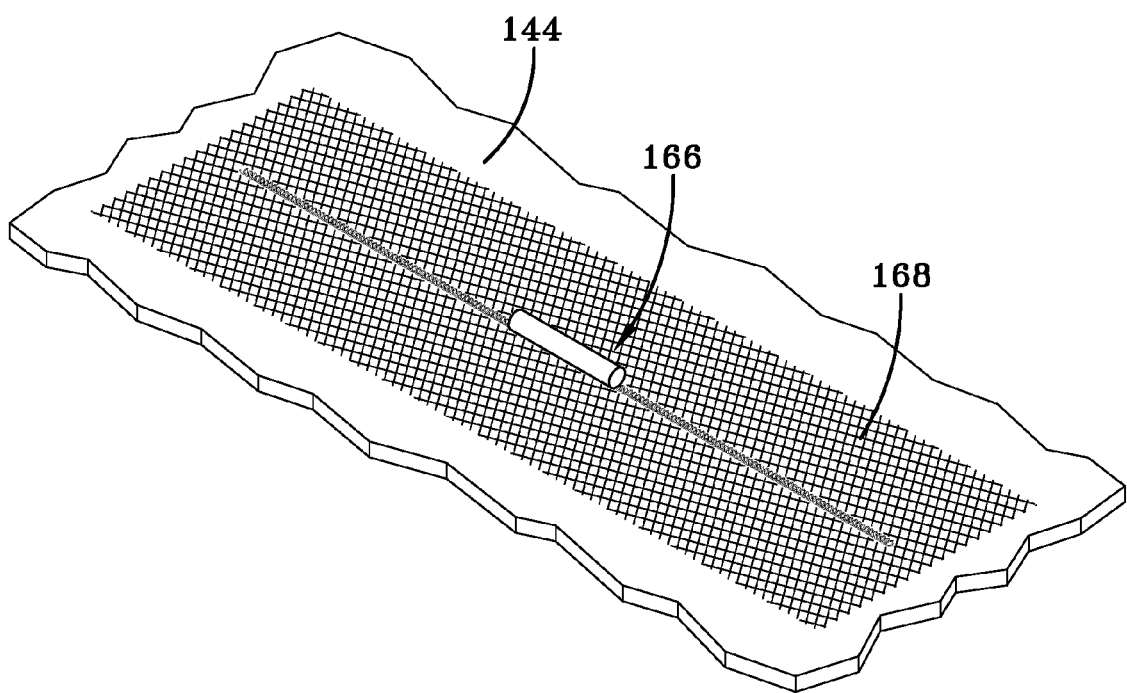
FIG. 19 is a side elevation of an alternative embodiment of an antenna device utilizing a dipole and reflective screen.

FIG. 18 depicts a graph of the E field at tag level, with a one volt drive. The graph plots electric field intensity at the tag level in a one dipole and a two dipole system. FIG. 17 is a graph at the tag level showing the effect of adding a reflective screen beneath one dipole and two dipole systems. The E field at the tag level is measured utilizing a 1 Watt drive. As shown, the addition of a screen below the dipole(s) beneficially intensifies the E-field at the tag level in both the single and double dipole systems.

With reference to FIGS. 11 and 14, it will be appreciated that the subject RFID reader reads the RFID tags 102 in a wheel unit 110 as a vehicle drives over a selected location on the pad 144. The pad 144 may be located in sundry locations where an identification of the wheel/tire, vehicle, and/or cargo is beneficial to the user. The read system may be used for logistics and fleet maintenance of commercial vehicles and can automatically log tires used in lease and maintenance contract locations. The antenna devices 122, in the form shown in FIG. 11 or in other antenna configurations such as, but not limited to, the dipole antenna of FIG. 19, may be buried in the concrete or other material composing the pad 144. In line arrays or antenna devices 122 or other configurations may be disposed in a preferred orientation across the pad 144 to ensure that a positive reading of the RFID tag 102 by the time the vehicle departs from the pad 144. The embedding of antenna devices within the pad 144 avoids contact with moving obstructions such as the vehicle or mud flaps of the vehicle. Moreover, such positioning of the antenna devices 122 within the pad 144 allows suitable location of the devices to read tags of both tires in a dual tire system.

The antenna device 122 of FIG. 3 utilizes spacers 136, 138, and 140 to structurally reinforce the layered configuration of the device from damage from the vehicle tire rolling over the device. In addition, the spacers 136, 138, 140 and the cover layer 124 and bottom layer 132 may be composed of a material such as a plastic having a static permittivity less than the dielectric layer 128 of the antenna device so as to concentrate energy out of the device 122. Addition of a reflective screen may further be utilized to concentrate the static electric field toward the RFID transponder in the wheel unit in a single or double dipole antenna system as explained previously.

From the foregoing, it will be understood that multiple antenna devices may be configured in an in-line array and connected to one or multiple electric field generators. The array aligns with the wheel-based RFID tags of the vehicle and operatively couples a plurality of in-line electric fields with the RFID tag(s) as the vehicle moves over and departs from the pad. The RFID tags may be rim or tire mounted to rotate with the wheel unit. The in-line array of antennae have a spacing operative to proximally and sequentially couple with the RFID tags as the wheel unit(s) roll across the pad.

One or more secondary above-ground antenna device(s) (not shown) may be employed if desired in conjunction with the drive-over embedded antennae, each coupled to an electric field generating transmitter device and located to operatively subject the vehicle wheel-mounted RFID tags to a secondary electric field as the vehicle moves across the pad.

The monitored parameter-data transmission system 10 and the information data system 100 within a read station 40 collectively provide the capability of reading data from a vehicle having RFID tags, monitored parameter transponders, or both. The systems 10 and 100 may be located at the same location on the pad within the read station or located at different locations, depending on the electrical field and logistical requirements of the systems. Replicated arrays of antennas from both systems may be deployed along the pad so that redundant transmission and receipt of data from the RFID tags and the monitored parameter transponders may occur. Such redundancy ensures accurate and complete data transmission and receipt as the vehicle traverses across the read station pad along a read path.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A read station for a vehicle supported by at least one wheel unit, comprising:
  a support pad admitting a vehicle to an upper pad surface;
  a plurality of data-receiving systems for selectively receiving at least one data transmission from the vehicle with the vehicle situated on the upper pad surface, the plurality of data-receiving systems including an identification-data transmission system and a monitored parameter-data transmission system;
  wherein the identification-data transmission system comprises: an identification data receiver proximally disposed adjacent to the support pad; an RFID transponder affixed to a vehicle wheel unit; a data transmission initiation signal generator, and at least one RF loop antenna connected to the data transmission initiation signal generator and disposed on the support pad to operationally transmit an RFID data transmission initiation signal from the data transmission signal generator to the RFID transponder; and the RFID transponder responsive to a receipt of the data transmission initiation signal transmitting identification data by air transmission to the data receiver; and
  the monitored parameter-data transmission system comprises a wheel-unit mounted monitoring device and at least one monitored parameter data receiver disposed adjacent to the support pad to operationally receive a monitored parameter-data transmission from the monitoring device.

2. The read station of claim 1, wherein the identification-data transmission system and the monitored parameter-data transmission system are synchronized to sequentially process a respective data transmission from the vehicle situated on the upper pad surface.

3. The read station of claim 1, wherein the identification-data transmission system and monitored parameter-data transmission system are synchronized to simultaneously effect a respective data transmission from the vehicle situated on the upper pad surface.

4. The read station of claim 1, wherein at least one of the data-receiving systems operationally effects data transmission from the vehicle as the vehicle moves across the support pad.

5. The read station of claim 1, wherein the monitoring device operationally measures at least one wheel unit parameter and generates a data transmission indicative of the at least one measured wheel unit parameter.

6. The read station of claim 5, wherein the at least one measured wheel unit parameter is tire air pressure.

7. The read station of claim 1, wherein the monitored parameter-data transmission system comprises a wheel-unit mounted monitoring device unit and at least one receiver disposed to operationally receive a monitored parameter-data transmission from the monitoring device.

8. The read station of claim 7, wherein the monitored parameter-data transmission system further comprises at least one pad-mounted antenna and an initiation signal generator coupled to the antenna for directing an electric field that couples with the monitoring device.

9. The read station of claim 1, wherein the identification-data transmission system and the monitored parameter-data transmission system each comprise at least one pad-mounted antenna.

10. The read station of claim 8, wherein the at least one pad-mounted antenna is embedded within the support pad.

11. The read station of claim 10, wherein the at least one embedded pad-mounted antenna is positioned along a vehicle pad-traversing path.

12. A method for transmitting data from a vehicle supported by at least one wheel unit, comprising:
    moving the vehicle to an upper pad surface of a support pad;
    transmitting a data transmission initiation signal to a wheel-based RFID device of the vehicle by a pad-based antenna loop;
    transmitting identification-data by air-based transmission from the vehicle RFID device to a receiver proximally positioned adjacent to the support pad;
    transmitting monitored parameter-data from the vehicle to the receiver by air-based transmission;
    removing the vehicle from the upper pad surface.

13. The method of claim 12, further comprising:
    moving the vehicle over the upper pad surface along a read path that operationally aligns at least one data transmitting device mounted to a wheel unit of the vehicle over a pad-mounted antenna.

14. The method of claim 13, further comprising:
    transmitting identification-data to the pad-mounted antenna as the vehicle moves over the pad-mounted antenna along the read path.

15. The method of claim 12, further comprising:
    transmitting identification-data as the vehicle moves over the upper pad surface along a read path.

16. The method of claim 12, further comprising:
    transmitting monitored parameter-data as the vehicle moves over the upper pad surface along a read path.

* * * * *